Patented Nov. 13, 1934

1,980,813

UNITED STATES PATENT OFFICE 1,980,813

ARTICLE OF RUBBER AND METHOD OF MAKING IT

Evelyn William Madge, Stockland Green, Birmingham, England, assignor to Dunlop Rubber Company Limited, a corporation of Great Britain No Drawing. Application February 5, 1931, Serial No. 513,783. In Great Britain March 31, 1930

3 Claims. (Cl. 18—53)

This invention comprises improvements in or relating to the manufacture of goods of rubber or similar material by any one or more operations such as dipping, spreading, impregnating, spraying or moulding from aqueous emulsions or dispersions of the kinds hereinafter specified, having admixed therein variable quantities of one or more reagents substantially inactive towards the emulsions or dispersions aforesaid which by interaction, chemical or otherwise, accelerated for instance, by the application of heat, produce one or more substances in situ which function as active coagulating agents.

The object of the invention is to produce by any one or more of the aforesaid operations porous or micro-porous articles of vulcanized rubber or the like, in particular, battery separators or filtering cones.

According to the invention the deposits obtained by any one or more of the aforesaid operations are vulcanized under such conditions that evaporation of the liquid contained in the pores or micro-pores is prevented.

The deposits obtained from the aqueous dispersions aforesaid are to be such as to contain desired amounts of the dispersing medium substantially uniformly distributed in the pores, capillaries or cells of microscopic or ultra-microscopic dimensions of the structure of the solids produced. The deposits so formed are strong, homogeneous, irreversible, solid structures without pores visible to the naked eye.

If the subsequent vulcanization of the deposits obtained is carried out in such manner as to prevent the escape of the dispersion medium included in their structure, porous or micro-porous articles are obtained.

Among the reagents which can be employed for the purpose of this invention are, for instance, the sulphates, chlorides and nitrates and acetates of the alkali metals including ammonium in conjunction with oxides and hydroxides of di- and tri-valent metals.

Particularly useful in this connection is the addition of the ammonium salts of the strong acids to a latex mixing containing zinc oxide, the zinc oxide serving as a known activator of vulcanization and at the same time conditioning the latex mixing so as to make it capable of gelling on the application of heat upon the addition of a suitable proportion of the aforesaid ammonium salts.

One or more of the non-coagulating substances which decompose or interact by rise in temperature with the formation of one or more acid coagulants and which are incorporated in the emulsions or dispersions aforesaid for the purpose of gelling the aforesaid emulsions or dispersions as described and claimed in Patent 1,870,788, August 9, 1932 have also been found suitable for the purpose of this invention. Such mixtures in the dispersion as ammonium persulphate and trioxymethylene or of ammonium persulphate and formaldehyde or acetaldehyde or a thiosulphate such as barium or ammonium thiosulphate and lead acetate or a peracid as described in said Patent 1,870,788 may be employed. Such mixtures upon heating serve to form acids or other coagulants which gel or coagulate the dispersion.

The emulsions or dispersions comprise by way of example, those consisting of or containing rubber, gutta-percha, balata or similar vegetable resins occurring naturally or artificially obtained.

Aqueous dispersions of coagulated rubber, vulcanized rubber, synthetic rubber, waste or reclaim, may also be employed, if desired, as alternatives or admixtures.

Any of the aforesaid dispersions may contain the usual known compounding ingredients and/or may be in concentrated form.

Concentrates such as are obtained in Patent 1,846,164, Feb. 23, 1932, to which may be added any one or more of the usual compounding ingredients, may also be used. All of these materials and others of similar nature, whether artificial or natural products are generically designated herein as rubber material.

The following example illustrates how the process can be effected for the production of micro-porous ebonite separators.

A latex mixing of the following composition:

| | Parts by weight |
|---|---|
| Rubber | 100 |
| Sulphur | 50 |
| Zinc oxide | 2 |
| Zinc oleate | 3 |
| Mineral oil | 10 |
| Lamp black | 2 | is prepared from a 60% rubber latex obtained by centrifugal action. The final alkalinity of the mixing is 0.15% expressed in terms of ammonia and the solid content 45% to 50%. This latex mixing is cooled to about 5° C. To 100 grams of this fluid mixing 3 ccs. of 25% ammonium sulphate also previously cooled are added and the resulting thin fluid is poured into a separator mould. After closing the mould and clamping the mixing may be directly vulcanized, gelling taking place in the vulcanizing operation, or allowed to gel in hot water and subsequently vulcanized.

The vulcanization is made to take place whilst the mould is completely immersed in hot water and subjected to a steam pressure, care being taken that the mould is totally immersed during the vulcanization. Good vulcanization can be made to take place in 2½ hours at 75 to 80 lbs. pressure of steam, after which the mould is cooled before opening and the separator produced is then rinsed and allowed to dry.

Having now particularly described and ascertained the nature of my said invention and in what manner the same is to be performed I declare that what I claim is:—

1. A process for the manufacture of porous or microporous articles of vulcanized rubber material from an aqueous dispersion thereof which comprises mixing in said dispersion a member of the group of reagents consisting of the sulphates, chlorides, nitrates and acetates of the alkali metals including ammonium which do not gel or coagulate the dispersion in the quantity present therein, and a member of the group of reagents consisting of the oxides and hydroxides of di- and tri-valent metals which by interaction produce products in situ which in the quantity added at an elevated temperature gel said dispersion to form a continuous medium of the rubber material containing microscopic particles of aqueous liquid, and thereafter vulcanizing the products obtained under such conditions that evaporation of contained liquid is prevented.

2. The process of claim 1 in which the member of the oxides and hydroxides group is zinc oxide.

3. The process of claim 1 in which the member of the group of alkali metal salts is an ammonium salt of a strong acid and the member of the oxide and hydroxide group is zinc oxide.

EVELYN WILLIAM MADGE.